US011535565B2

(12) United States Patent
Ito et al.

(10) Patent No.: US 11,535,565 B2
(45) Date of Patent: Dec. 27, 2022

(54) BLACK SINTERED BODY AND METHOD FOR PRODUCING THE SAME (71) Applicant: TOSOH CORPORATION, Yamaguchi (JP)

(72) Inventors: Takeshi Ito, Kanagawa (JP); Shoichi Yamauchi, Kanagawa (JP); Isao Yamashita, Kanagawa (JP)

(73) Assignee: TOSOH CORPORATION, Yamaguchi (JP)

( * ) Notice: Subject to any disclaimer, the term of this patent is extended or adjusted under 35 U.S.C. 154(b) by 0 days.

(21) Appl. No.: 17/264,362

(22) PCT Filed: Jul. 31, 2019

(86) PCT No.: PCT/JP2019/030005
§ 371 (c)(1),
(2) Date: Jan. 29, 2021

(87) PCT Pub. No.: WO2020/027195
PCT Pub. Date: Feb. 6, 2020

(65) Prior Publication Data
US 2021/0300828 A1 Sep. 30, 2021

(30) Foreign Application Priority Data
Aug. 2, 2018 (JP) .............................. JP2018-145694

(51) Int. Cl.
C04B 35/488 (2006.01)
C04B 35/49 (2006.01)
C04B 35/645 (2006.01)

(52) U.S. Cl.
CPC .......... *C04B 35/49* (2013.01); *C04B 35/4885* (2013.01); *C04B 35/645* (2013.01); *C04B 2235/3222* (2013.01); *C04B 2235/3232* (2013.01); *C04B 2235/3246* (2013.01); *C04B 2235/3272* (2013.01); *C04B 2235/3275* (2013.01); *C04B 2235/656* (2013.01); *C04B 2235/663* (2013.01); *C04B 2235/664* (2013.01); *C04B 2235/786* (2013.01); *C04B 2235/9661* (2013.01)

(58) Field of Classification Search
CPC . C04B 35/486; C04B 35/488; C04B 35/4885; C04B 35/49
See application file for complete search history.

(56) References Cited

U.S. PATENT DOCUMENTS

| | | | | |
|---|---|---|---|---|
| 9,174,877 B2 * | 11/2015 | Yamauchi | ............... | C04B 35/49 |
| 9,428,422 B2 * | 8/2016 | Kawamura | ............... | A61K 6/78 |
| 9,962,247 B2 * | 5/2018 | Fujisaki | ................. | C01G 25/02 |
| 10,555,795 B2 * | 2/2020 | Fujisaki | ................. | C04B 35/48 |
| 2013/0217562 A1 * | 8/2013 | Yamauchi | ............. | C04B 35/486 501/86 |
| 2015/0315086 A1 * | 11/2015 | Kawamura | ......... | C04B 35/6455 501/134 |
| 2017/0143458 A1 * | 5/2017 | Fujisaki | ............ | C04B 35/62645 |
| 2017/0349494 A1 | 12/2017 | Yamashita et al. | | |
| 2018/0221120 A1 * | 8/2018 | Fujisaki | ................ | C01F 17/218 |
| 2018/0222799 A1 | 8/2018 | Yamauchi et al. | | |
| 2019/0194076 A1 | 1/2019 | Yang et al. | | |

FOREIGN PATENT DOCUMENTS

| | | |
|---|---|---|
| CN | 106431394 A | 2/2017 |
| CN | 107108374 A | 8/2017 |
| CN | 107922272 A | 4/2018 |
| EP | 3 950 638 A1 | 2/2022 |
| JP | 7-291630 A | 11/1995 |
| JP | 2006-342036 A | 12/2006 |
| JP | 2007-308338 A | 11/2007 |
| JP | 2016-216289 A | 12/2016 |
| JP | 2017-77976 A | 4/2017 |
| JP | 2017-160108 A | 9/2017 |
| JP | 2017-160110 A | 9/2017 |

OTHER PUBLICATIONS

International Search Report issued in International Patent Application No. PCT/JP2019/030005, dated Oct. 1, 2019, along with an English translation thereof.
Written Opinion of the International Search Authority issued in International Patent Application No. PCT/JP2019/030005, dated Oct. 1, 2019, along with an English translation thereof.
International Preliminary Report on Patentability in International Application No. PCT/JP2019/030005, dated Oct. 1, 2019, along with an English translation thereof.

* cited by examiner

Primary Examiner — Karl E Group
(74) Attorney, Agent, or Firm — Greenblum & Bernstein, P.L.C.

(57) ABSTRACT

A sintered body includes a solid solution containing cobalt and iron, with the balance being zirconia. The total content of cobalt in terms of CoO and iron in terms of $Fe_2O_3$ is more than 0.1 wt % and less than 3.0 wt %, and the proportion of cobalt regions larger than 5.5 μm² in an elemental map obtained using an electron probe microanalyzer is 25% or less.

14 Claims, 1 Drawing Sheet

BLACK SINTERED BODY AND METHOD FOR PRODUCING THE SAME

TECHNICAL FIELD

The present invention relates to a sintered body that includes a coloring agent and zirconia, and particularly to a sintered body that includes a coloring agent and zirconia and exhibits a black color.

BACKGROUND ART

It has previously been studied to color a sintered body, that is, to make the color tone of a zirconia sintered body different from the color tone inherent in zirconia. It has been reported that to obtain a sintered body that exhibits a black color, a compound including chromium (Cr) is used as a coloring agent, and the coloring agent and zirconia are mixed together and sintered (e.g., PTL 1). PTL 1 has also disclosed that cobalt (Co) and iron (Fe) are used as coloring agents, and the coloring agents and zirconia are mixed together and sintered to thereby obtain a sintered body that exhibits a black color.

Meanwhile, since chromium is an element difficult to handle, it has been studied to color a sintered body without using chromium (PTLs 2 and 3). For example, a sintered body obtained by using cobalt oxide and iron oxide as coloring agents and firing them in air (PTL 2) and a sintered body containing a novel coloring agent formed of a Co—Zn—Fe—Al-based composite oxide (PTL 3) have been reported as zirconia sintered bodies that exhibit a black color.

CITATION LIST

Patent Literature

PTL 1: Japanese Unexamined Patent Application Publication No. 2006-342036
PTL 2: Japanese Unexamined Patent Application Publication No. 07-291630
PTL 3: Japanese Unexamined Patent Application Publication No. 2007-308338

SUMMARY OF INVENTION

Technical Problem

Sintered bodies of the related art exhibit a black color through the use of a large amount of coloring agent or the use of a novel coloring agent. In contrast, it is an object of the present invention to provide a sintered body in which the content of a coloring agent is reduced compared with sintered bodies of the related art and which exhibits a color tone visually perceived as a black color without a tint (hereinafter also referred to as a "jet-black color").

Solution to Problem

The present inventors have found that by controlling the distribution state of a coloring agent in a sintered body, the sintered body exhibits a jet-black color even if the amount of the coloring agent is small, thereby completing the present invention.

Thus, the gist of the present invention is as follows.
[1] A sintered body comprising a solid solution containing cobalt and iron, with the balance being zirconia, wherein a total content of cobalt in terms of CoO and iron in terms of $Fe_2O_3$ is more than 0.1 wt % and less than 3.0 wt %, and a proportion of cobalt regions larger than 5.5 $\mu m^2$ in an elemental map obtained using an electron probe microanalyzer is 25% or less.
[2] The sintered body according to [1], wherein a proportion of iron regions larger than 6.5 $\mu m^2$ in the elemental map obtained using an electron probe microanalyzer is 30% or less.
[3] The sintered body according to [1] or [2], wherein a proportion of iron regions larger than 5.0 $\mu m^2$ in the elemental map obtained using an electron probe microanalyzer is 50% or less.
[4] The sintered body according to any one of [1] to [3], comprising aluminum oxide.
[5] The sintered body according to any one of [1] to [4], wherein the zirconia contains at least one selected from the group consisting of yttria, calcia, magnesia, vanadia and titania.
[6] The sintered body according to any one of [1] to [5], wherein the zirconia contains titania and yttria.
[7] The sintered body according to any one of [1] to [6], wherein the zirconia contains titania in an amount of 1.0 mol % or more and 6.0 mol % or less and yttria in an amount of 2.0 mol % or more and 4.0 mol % or less.
[8] The sintered body according to any one of [1] to [7], wherein the zirconia has a monoclinic fraction of 10% or less.
[9] The sintered body according to any one of [1] to [8], wherein crystal particles of the zirconia have an average size of 3.0 $\mu m$ or less.
[10] A method for producing the sintered body according to any one of [1] to [9], comprising a sintering step of sintering, in a reducing atmosphere, a green body including a cobalt compound and an iron compound, with the balance being zirconia, wherein a total content of cobalt in terms of CoO and iron in terms of $Fe_2O_3$ is more than 0.1 wt % and less than 3.0 wt %.
[11] The production method according to [10], wherein the reducing atmosphere is an atmosphere in which at least one of a reducing gas or a reducing heating material is used.
[12] The production method according to [10] or [11], wherein a sintering method in the sintering step is pressure sintering.
[13] The production method according to any one of [10] to [12], comprising a presintering step of sintering the green body in a non-reducing atmosphere to obtain a presintered body.
[14] The production method according to any one of [10] to [13], comprising a heat treatment step of heat treating the sintered body in an oxidizing atmosphere at 650° C. or higher and 1100° C. or lower.

Advantageous Effects of Invention

According to the present invention, a sintered body in which the content of a coloring agent is reduced compared with sintered bodies of the related art and which exhibits a jet-black color can be provided.

DESCRIPTION OF EMBODIMENTS

Hereinafter, an embodiment of the present invention will be described.

A sintered body according to this embodiment comprises a solid solution containing cobalt and iron (hereinafter also referred to as a "Co—Fe solid solution"). The Co—Fe solid solution functions as a coloring agent that exhibits a black color. A sintered body not comprising a Co—Fe solid solution but comprising iron alone or cobalt alone cannot provide the sintered body according to this embodiment, for example, because such a sintered body has a color tone different from that of the sintered body according to this embodiment or is likely to develop a defect.

The Co—Fe solid solution in the sintered body according to this embodiment can be identified by elemental mapping using an electron probe microanalyzer (hereinafter also referred to simply as "elemental mapping").

Figure 1:
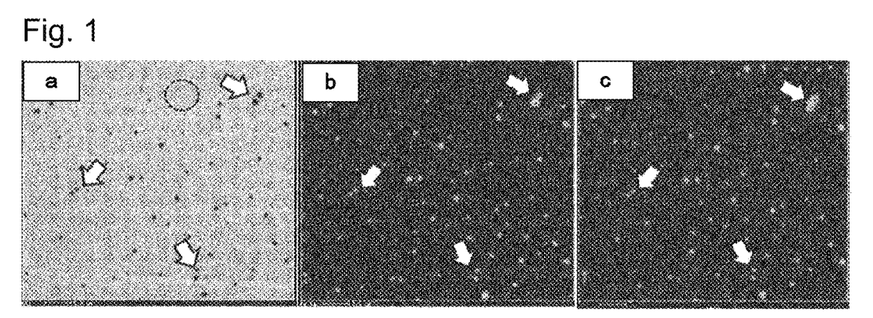
FIG. 1 Elemental maps of Example 3 ((a) backscattered electron image, (b) Fe, (c) Co)
FIG. 2 Elemental maps of Example 17 ((a) elemental map of Co, (b) binarized elemental map
FIG. 3 Elemental maps of Example 17 ((a) Y, (b) Ti) )

FIG. 1 shows an example of elemental mapping of the sintered body according to this embodiment. FIGS. 1(a) to 1(c) show a backscattered electron image of a sintered body (FIG. 1(a)), a map of iron (FIG. 1(b)) and a map of cobalt (FIG. 1(c)) in the same field of view. In the backscattered electron image, zirconia, which is a base material, and the Co—Fe solid solution are observed as a light-colored region (dashed circle in FIG. 1(a)) and a dark-colored region (arrow in FIG. 1(a)), respectively. In FIG. 1(a), it can be observed that the Co—Fe solid solution is distributed as substantially spherical regions mainly having a diameter of 0.1 μm or more and less than 3.5 μm.

In the maps of iron and cobalt, it can be observed that cobalt and iron are distributed in the same places as the regions of the Co—Fe solid solution in FIG. 1(a) (arrows in FIGS. 1(a) to 1(c)). In FIGS. 1(b) and 1(c), it can be observed that since cobalt and iron are included in the substantially spherical regions of the backscattered electron image, Co and Fe are uniformly dissolved in particles of the Co—Fe solid solution. From FIGS. 1(a) to 1(c), it can be observed that the Co—Fe solid solution is included, in the sintered body, in the form of particles, specifically, substantially spherical particles, and more specifically, substantially spherical particles having a diameter of 0.1 μm or more and less than 3.5 μm.

One reason why the sintered body according to this embodiment comprises the Co—Fe solid solution in such a distribution state is that cobalt and iron form a solid solution while being taken into zirconia and the solid solution is reprecipitated as fine particles from zirconia particles.

In the sintered body according to this embodiment, the proportion of cobalt regions larger than 5.5 μm² (hereinafter also referred to as a "Co distribution (5.5)") in an elemental map is 25% or less, preferably 20% or less, more preferably 10% or less, still more preferably 5% or less, and particularly preferably 3% or less. The Co distribution (5.5) is an index that indicates a distribution state of the Co—Fe solid solution in the sintered body according to this embodiment. Due to the inclusion of cobalt and iron and such a Co distribution (5.5), the sintered body according to this embodiment exhibits a color tone (jet-black color) visually perceived as a black color without a tint.

In this embodiment, the proportion of element M regions larger than X μm² in an elemental map is hereinafter also referred to as an "M distribution (X)", and an M distribution ($X_1$), an M distribution ($X_2$), . . . and an M distribution ($X_n$) are also collectively referred to simply as an "M distribution".

When there is such an ununiform distribution of the Co—Fe solid solution that influences the color tone visually perceived, such as the presence of coarse particles of the Co—Fe solid solution or uneven distribution of the particles of the Co—Fe solid solution, the Co distribution (5.5) exceeds 25%. In other words, an increase in the presence of coarse particles or the uneven distribution of the particles increases the likelihood that the sintered body exhibits an uneven and ununiform color tone or a color tone different from a jet-black color. Moreover, the presence of coarse particles or the uneven distribution of the particles increases the likelihood of defects occurring during production.

For the same reason, an Fe distribution (6.5) is preferably 30% or less, more preferably 25% or less, still more preferably 20% or less, even more preferably 10% or less, and particularly preferably 3% or less.

In the sintered body according to this embodiment, the Co—Fe solid solution is preferably more uniformly distributed, and at least one of the Co distributions or the Fe distributions given below is preferably satisfied.

Co distribution (5.0): 30% or less, preferably 25% or less, more preferably 15% or less, still more preferably 10% or less, and particularly preferably 5% or less Co distribution (4.5): 35% or less, preferably 30% or less, more preferably 25% or less, still more preferably 10% or less, and particularly preferably 5% or less Co distribution (3.5): 55% or less, preferably 50% or less, more preferably 35% or less, still more preferably 15% or less, and particularly preferably 8% or less Fe distribution (5.5): 45% or less, preferably 35% or less, more preferably 25% or less, still more preferably 15% or less, even more preferably 5% or less, and particularly preferably 3.5% or less Fe distribution (5.0): 50% or less, preferably 45% or less, more preferably 40% or less, still more preferably 20% or less, and particularly preferably 5% or less Fe distribution (4.5): 60% or less, preferably 50% or less, more preferably 15% or less, still more preferably 10% or less, and particularly preferably 5% or less Fe distribution (3.5): 70% or less, preferably 60% or less, more preferably 20% or less, still more preferably 15% or less, and particularly preferably 10% or less In the sintered body according to this embodiment, the proportion of cobalt regions larger than 0 μm² and smaller than 2.0 μm² (hereinafter also referred to as the "most frequent Co region") in all the cobalt regions in an elemental map is preferably 40% or more, and more preferably 80% or more.

In the sintered body according to this embodiment, the proportion of iron regions larger than 0 μm² and smaller than 2.0 μm² (hereinafter also referred to as the "most frequent Fe region") in all the iron regions in an elemental map is preferably 50% or more, and more preferably 60% or more.

The elemental mapping in this embodiment may be performed such that elemental maps of elements are measured under the following conditions using a sintered body having a surface roughness (Ra) of 0.02 μm or less as a measurement sample.

Measurement mode: wavelength-dispersive mode

Acceleration voltage: 15 kV

Irradiation current: 300 nA

Analysis area: 51.2 μm×51.2 μm

Number of fields of view: three to five fields of view

The M distribution, the most frequent Co region and the most frequent Fe region can each be determined by the following method from the obtained elemental map of each element.

Figure 2:
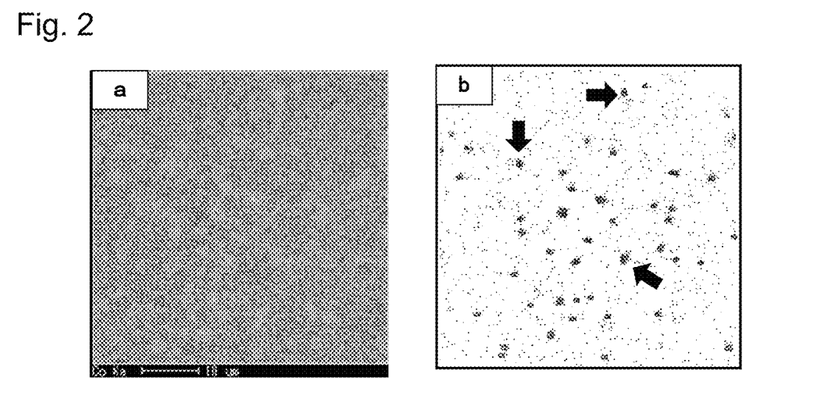

FIG. 2 shows an example of elemental mapping. A minimum characteristic X-ray intensity observed in an elemental map (FIG. 2(b)) obtained by binarizing an elemental map (FIG. 2(a)) of an element is regarded as a background intensity, and the number of regions where the characteristic X-ray intensity is 1.5 times or more the background intensity (hereinafter also referred to as "detection regions", e.g., arrows in FIG. 2(b)) and the number of regions corresponding to a target area (hereinafter also referred to as "target regions") are counted. For example, in the case of Co (5.5), the target region is a region larger than 5.5 µm$^2$, and in the case of the most frequent Co region, the target region is a region larger than 0 µm$^2$ and smaller than 2.0 µm$^2$.

The proportion of the number of target regions relative to the number of detection regions is determined, and this can be used as a distribution of the element. For example, the proportion of the number of regions measuring 5.5 µm$^2$ or more relative to the number of regions where the characteristic X-ray intensity of cobalt is 1.5 times the background intensity is the Co distribution (5.5), and the proportion of the number of regions measuring 5.0 µm$^2$ or more is the Co distribution (5.0).

The binarization, the detection of detection regions and target regions, and the count of the number thereof can be performed using software (e.g., EPMA system Ver.2.14 manufactured by Shimadzu Corporation) included with a general-purpose electron probe microanalyzer. One example of the electron probe microanalyzer is an EPMA 1610 manufactured by Shimadzu Corporation. Due to differences in the procedure of measurement, the detection region and the target region may be different in size from the Co—Fe solid solution observed in a backscattered electron image or an elemental map.

The sintered body according to this embodiment may comprise at least one of cobalt oxide or iron oxide in addition to the Co—Fe solid solution.

In the sintered body according to this embodiment, the total content (hereinafter also referred to as the "coloring agent content") of the content of cobalt in terms of CoO (hereinafter also referred to as the "cobalt content") and the content of iron in terms of Fe$_2$O$_3$ (hereinafter also referred to as the "iron content") is more than 0.1 wt % and less than 3.0 wt %, preferably more than 0.1 wt % and 2.5 wt % or less, more preferably 0.12 wt % or more and 2.5 wt % or less, and still more preferably 0.2 wt % or more and 1.5 wt % or less. If the coloring agent content is 0.1 wt % or less, the sintered body has a grayish color tone. If the coloring agent content is 3.0 wt % or more, defects during production and variations in color tone from one to another are likely to occur, thus making it difficult to stably produce the sintered body according to this embodiment.

A particularly preferred coloring agent content in the sintered body according to this embodiment is, for example, 0.1 wt % or more and less than 1.0 wt %, or 0.2 wt % or more and less than 1.0 wt %.

In the sintered body according to this embodiment, the cobalt content relative to coloring agent content is preferably 0.10 or more and 0.98 or less, and more preferably 0.10 or more and 0.50 or less.

The sintered body according to this embodiment may comprise aluminum oxide and preferably comprises alumina (Al$_2$O$_3$). When the sintered body comprises aluminum oxide, the content of aluminum in terms of Al$_2$O$_3$ (hereinafter also referred to as the "alumina content") is preferably 0.1 wt % or more and 3.0 wt % or less, more preferably 0.1 wt % or more and 2.5 wt % or less, more preferably 0.2 wt % or more and 2.5 wt % or less, still more preferably 0.1 wt % or more and 2.0 wt % or less, still more preferably 0.2 wt % or more and 2.0 wt % or less, even more preferably 0.1 wt % or more and 1.0 wt % or less, and particularly preferably 0.2 wt % or more and 1.0 wt % or less. When the content of aluminum oxide is 3.0 wt % or less, the alumina has substantially no influence on the color tone of the sintered body according to this embodiment, and the formation of monoclinic zirconia tends to be suppressed even when the coloring agent content is high. When comprising aluminum oxide, the sintered body according to this embodiment may comprise a composite oxide of Al and Co, for example, cobalt aluminate (CoAl$_2$O$_4$). The sintered body may comprise a composite oxide such as cobalt aluminate to the extent that the effects of the sintered body according to this embodiment are not impaired.

The sintered body according to this embodiment is preferably free of impurities other than unavoidable impurities such as hafnium (Hf) and particularly preferably free of (i.e., 0 wt %) zinc (Zn) and chromium (Cr). In the sintered body according to this embodiment, the content of zinc in terms of ZnO (hereinafter also referred to as the "zinc content") and the content of chromium in terms of Cr$_2$O$_3$ (hereinafter also referred to as the "chromium content") are each preferably less than 0.1 wt %, more preferably 0.05 wt % or less, and particularly preferably at or below the detection limit in a commonly used composition analysis (e.g., 0.005 wt % or less).

The balance of the sintered body according to this embodiment is zirconia. In the sintered body according to this embodiment, the content of zirconia in terms of ZrO$_2$ (hereinafter also referred to as the "zirconia content") is, for example, 94.0 wt % or more, preferably 95.0 wt % or more, and more preferably 97.0 wt % or more.

In this embodiment, the cobalt content, the iron content, the coloring agent content, the alumina content, the zirconia content, the zinc content and the chromium content are each a weight percentage of each component relative to the weight of the sintered body according to this embodiment.

The zirconia (ZrO$_2$) included in the sintered body according to this embodiment preferably contains at least one selected from the group consisting of yttria (Y$_2$O$_3$), calcia (CaO), magnesia (MgO), vanadia and titania (TiO$_2$) (hereinafter also referred to as a "solute component"), and more preferably contains yttria. Since the particles of the Co—Fe solid solution in the sintered body tend to be fine, the zirconia preferably contains yttria and at least one selected from the group consisting of calcia, magnesia, vanadia and titania, and more preferably contains titania and yttria. Furthermore, since the particles of the Co—Fe solid solution in the sintered body tend to be particularly fine, it is particularly preferred that the total content of cobalt in terms of CoO and iron in terms of $Fe_2O_3$ be more than 0.1 wt % and 0.4 wt % or less, preferably more than 0.1 wt % and 0.3 wt % or less, and that the zirconia contain titania and yttria. In this embodiment, as the particles of the Co—Fe solid solution in the sintered body become finer, the sintered body tends to be visually perceived as having a more uniform color tone.

The content of a solute component may be any amount soluble in the zirconia, and the contents of solute components are each, for example, 2.0 mol % or more and 10.0 mol % or less.

In this embodiment, the content of a solute component is a proportion (mol %) of the solute component relative to the total of the zirconia and the solute component and determined from [solute component (mol)]/[solute component (mol)+$ZrO_2$ (mol)]×100. For example, when the zirconia contains yttria and titania, the yttria content (mol %) is determined from $[Y_2O_3$ (mol)]/$[Y_2O_3$ (mol)+$ZrO_2$ (mol)]× 100, and the titania content (mol %) is determined from $[TiO_2$ (mol)]/$[TiO_2$ (mol)+$ZrO_2$ (mol)]×100.

For example, a preferred content of a solute component is at least one of the following.

Yttria content: 2.0 mol % or more and 4.0 mol % or less, preferably 2.5 mol % or more and 3.5 mol % or less Titania content: 1.0 mol % or more and 6.0 mol % or less, preferably 1.5 mol % or more and 4.8 mol % or less The sintered body according to this embodiment preferably does not include an element that is soluble in zirconia and greatly changes the color tone of the sintered body as a result of being dissolved, for example, at least one of erbia ($Er_2O_3$) or ceria ($CeO_2$). The contents thereof are preferably at or below the detection limit and are each, for example, 0 mol % or more and less than 1 mol %, in view of, for example, measurement errors.

In the sintered body according to this embodiment, the alumina content is preferably 0.1 wt % or more and 2.0 wt % or less, more preferably 0.1 wt % or more and 1.5 wt % or less, more preferably 0.1 wt % or more and 1.0 wt % or less, and more preferably 0.1 wt % or more and 0.5 wt % or less, and the titania content is preferably 1.0 wt % or more and 4.0 wt % or less, more preferably 1.0 wt % or more and 3.5 wt % or less, more preferably 1.2 wt % or more and 3.2 wt % or less, and more preferably 1.5 wt % or more and 3.0 wt % or less.

The crystal phase of the zirconia included in the sintered body according to this embodiment is not limited as long as the main phase is a tetragonal phase, and may be constituted by a tetragonal phase and a cubic phase. The main phase of the crystal phase of the zirconia included in the sintered body according to this embodiment is a most common phase in the crystal phase of the zirconia in a powder X-ray diffraction (hereinafter also referred to as "XRD") pattern measured under the following conditions.

Radiation source: CuKα radiation (λ=1.5405 Å)
Measurement mode: continuous scanning
Step width: 0.02°
Scanning speed: 5°/min
Measurement range: 2θ=20° to 80°

The content of the Co—Fe solid solution or the like in the sintered body according to this embodiment is insufficient to allow its XRD peak to be detected in an XRD pattern. Thus, the XRD pattern of the sintered body according to this embodiment is the same as the XRD pattern of the crystal phase of the zirconia included in the sintered body.

In the sintered body according to this embodiment, the monoclinic fraction of the zirconia is preferably 10% or less, more preferably 6.5% or less, still more preferably 2% or less, and more preferably 1% or less.

The monoclinic fraction of the zirconia is determined by the following formula from an XRD pattern of a surface of the sintered body according to this embodiment measured under the above conditions.

$$\text{Monoclinic fraction (\%)} = [I_m(111) + I_m(11\text{-}1)] \times 100 / [I_m(111) + I_m(11\text{-}1) + I_t(111) + I_c(111)]$$

In the above formula, $I_m(111)$ is an integrated intensity of the (111) plane of monoclinic zirconia, $I_m(11\text{-}1)$ is an integrated intensity of the (11-1) plane of monoclinic zirconia, $I_t(111)$ is an integrated intensity of the (111) plane of tetragonal zirconia, and, $I_c(111)$ is an integrated intensity of the (111) plane of cubic zirconia.

The average size of crystal particles (hereinafter also referred to as "average crystal particle size") of the zirconia included in the sintered body according to this embodiment is preferably 3.0 μm or less, and more preferably 2.5 μm or less. A particularly preferred average crystal particle size is, for example, 0.3 μm or more and 2.5 μm or less, or 0.5 μm or more and 1.3 μm or less.

In this embodiment, the average crystal particle size can be determined by observing a surface of the sintered body according to this embodiment at a magnification of 15,000 times using a scanning microscope, randomly selecting 200 or more, preferably 250±50, zirconia crystal particles from an SEM observation image obtained, measuring their crystal particle size by the intercept method (k=1.78), and calculating its average. In the SEM observation image of the sintered body according to this embodiment, zirconia crystal particles can be distinguished from particles other than zirconia crystal particles, such as the particles of the Co—Fe solid solution, and pores by differences in depth of color.

The sintered body according to this embodiment preferably has a color tone expressed by the L*a*b* color system such that the lightness L* is 10 or less, the hue a* is −2.00 or more and 2.00 or less, and the hue b* is −2.00 or more and 5.00 or less.

A particularly preferred color tone of the sintered body according to this embodiment is, for example, any combination of the following lightness L* and hues a* and b*.

Lightness L*: 0 or more and 9.0 or less, preferably 0 or more and 5.5 or less,
more preferably 0 or more and less than 3.0
Hue a*: −3.00 or more and 2.00 or less,
preferably −0.50 or more and 0.50 or less
Hue b*: −2.00 or more and 4.00 or less,
preferably −1.00 or more and 1.00 or less The color tone in the L*a*b* color system can be obtained by measuring a sintered body having a surface roughness (Ra) of 0.02 nm or less by a method in accordance with JIS Z 8722. The color tone, when determined by SCE method, which excludes specular reflected light and measures diffuse reflected light, can be evaluated as a color tone closer to the visually observed color tone.

The sintered body according to this embodiment has a biaxial bending strength as measured in accordance with ISO/DIS 6872 with a sample thickness of 1 mm (hereinafter also referred to simply as a "biaxial bending strength") of preferably 1400 MPa or more, and more preferably 1700 MPa or more. From the viewpoint of workability, the biaxial bending strength is preferably 3000 MPa or less, and more preferably 2500 MPa or less.

The sintered body according to this embodiment exhibits a color tone visually perceived as a black color without a tint and can be used for jewelry with a sense of luxuriousness and members such as decorative members, for example, various members such as watch parts and exterior parts of portable electronics.

Next, a method for producing a sintered body according to this embodiment will be described.

The method for producing a sintered body according to this embodiment is a production method comprising a sintering step of sintering, in a reducing atmosphere, a green body including a cobalt compound and an iron compound, with the balance being zirconia, wherein the total content of cobalt in terms of CoO and iron in terms of $Fe_2O_3$ is more than 0.1 wt % and less than 3.0 wt %. This can produce a sintered body that exhibits a jet-black color.

In the sintering step, a green body including a cobalt compound and an iron compound, with the balance being zirconia, wherein the total content of cobalt in terms of CoO and iron in terms of $Fe_2O_3$ is more than 0.1 wt % and less than 3.0 wt %, is sintered to thereby obtain a sintered body.

The green body subjected to the sintering step includes a cobalt compound and an iron compound, with the balance being zirconia. The green body is preferably free of impurities other than unavoidable impurities. The green body is preferably free of zinc and chromium (i.e., the zinc content and the chromium content are each 0 wt %), preferably each being less than 0.1 wt %.

The cobalt compound, which is a compound including cobalt (Co), is, for example, at least one selected from the group consisting of tricobalt tetroxide ($Co_3O_4$), cobalt oxide (III) ($Co_2O_3$), cobalt oxide (II) (CoO), cobalt oxyhydroxide (CoOOH), cobalt hydroxide ($Co(OH)_2$), cobalt nitrate ($Co(NO_3)_2$), cobalt chloride ($CoCl_2$) and cobalt sulfate ($CoSO_4$), and preferably at least one selected from the group consisting of $Co_3O_4$, $Co_2O_3$, CoO and CoOOH.

The iron compound, which is a compound including iron (Fe), is, for example, at least one selected from the group consisting of iron oxide (III, II) ($Fe_3O_4$), iron oxide (III) ($Fe_2O_3$), iron oxide (II) (FeO), iron oxyhydroxide (FeOOH), iron hydroxide (FeOH), iron nitrate ($Fe(NO_3)_2$), iron chloride (FeCl) and iron sulfate ($FeSO_4$), and preferably at least one selected from the group consisting of $Fe_3O_4$, $Fe_2O_3$, FeO and FeOOH.

The green body may include an aluminum compound. The aluminum compound, which is a compound including aluminum (Al), is, for example, at least one selected from the group consisting of alumina ($Al_2O_3$), aluminum hydroxide ($Al(OH)_3$), aluminum chloride ($AlCl_3$), aluminum isopropoxide ($C_9H_{21}O_3Al$) and aluminum nitrate ($Al(NO_3)_3$), and preferably at least one of alumina or aluminum hydroxide.

The cobalt compound, the iron compound and the aluminum compound may be a composite oxide including two or more selected from the group consisting of cobalt, iron and aluminum. The composite oxide is, for example, at least one selected from the group consisting of $CoFe_2O_4$ (cobalt ferrite), $CoAl_2O_4$ (cobalt aluminate), $FeAl_2O_4$ and $FeAlO_3$, and preferably $CoAl_2O_4$.

The zirconia ($ZrO_2$) may be a zirconia including at least one selected from the group consisting of yttria, calcia, magnesia, vanadia and titania, and is preferably a yttria-containing zirconia, more preferably a yttria-containing zirconia in which the yttria content is 2 mol % or more and 4 mol % or less, and still more preferably a yttria-containing zirconia in which the yttria content is 2.5 mol % or more and 2.5 mol % or less.

The green body may include a compound containing a solute component or a precursor thereof (hereinafter also referred to as a "solute component source"). Such a compound is, for example, at least one selected from the group consisting of yttrium compounds, calcium compounds, magnesium compounds, vanadium compounds and titanium compounds, preferably at least one of an yttrium compound or a titanium compound, and more preferably a titanium compound.

The yttrium compound is, for example, at least one selected from the group consisting of yttria, yttrium chloride and yttrium hydroxide, and preferably at least one of yttria or yttrium chloride. The calcium compound is, for example, at least one selected from the group consisting of calcia, calcium chloride and calcium hydroxide, and preferably at least one of calcia or calcium chloride. The magnesium compound is, for example, at least one selected from the group consisting of magnesia, magnesium chloride and magnesium hydroxide, and preferably at least one of magnesia or magnesium chloride. The vanadium compound is, for example, at least one selected from the group consisting of vanadia, vanadium chloride and vanadium hydroxide, and preferably at least one of vanadia or vanadium chloride. The titanium compound is, for example, at least one selected from the group consisting of, titania, titanium chloride, titanium hydroxide and titanium tetraisopropoxide, and preferably at least one of titania or titanium hydroxide.

In the green body, the total content of cobalt in terms of CoO (cobalt content) and iron in terms of $Fe_2O_3$ (iron content) is more than 0.1 wt % and less than 3.0 wt %, preferably more than 0.1 wt % and 2.5 wt % or less, more preferably 0.12 wt % or more and 2.5 wt % or less, and particularly preferably 0.2 wt % or more and 1.5 wt % or less.

The cobalt compound and the iron compound may be in any proportion, and the weight ratio of cobalt and iron in the green body in terms of CoO and $Fe_2O_3$, respectively, is preferably such that $CoO/(CoO+Fe_2O_3)$ is 0.10 or more and 0.99 or less, and preferably 0.10 or more and 0.50 or less.

When the green body includes an aluminum compound, the content of aluminum in terms of $Al_2O_3$ in the green body is preferably 0.1 wt % or more and 3.0 wt % or less, more preferably 0.1 wt % or more and 2.5 wt % or less, more preferably 0.2 wt % or more and 2.5 wt % or less, still more preferably 0.1 wt % or more and 2.0 wt % or less, still more preferably 0.2 wt % or more and 2.0 wt % or less, even more preferably 0.1 wt % or more and 1.0 wt % or less, and particularly preferably 0.2 wt % or more and 1.0 wt % or less.

The content of a solute component source is, for example, 2.0 mol % or more and 10.0 mol % or less. The content of a solute component source is a proportion (mol %) of the solute component source in terms of oxide relative to the total of the zirconia and the solute component source in terms of oxide and determined from [solute component source (mol)]/[solute component source (mol)+$ZrO_2$ (mol)]×100. For example, when the green body contains an yttrium compound and a titanium compound, the content (mol %) of the yttrium compound is determined from [$Y_2O_3$ (mol)]/[$Y_2O_3$ (mol)+$ZrO_2$ (mol)]×100, and the content (mol %) of the titanium compound is determined from [$TiO_2$ (mol)]/[$TiO_2$ (mol)+$ZrO_2$ (mol)]×100.

For example, a preferred content of a solute component source is at least one of the following.

Yttria content: 2.0 mol % or more and 4.0 mol % or less, preferably 2.5 mol % or more and 3.5 mol % or less Titania content: 1.0 mol % or more and 6.0 mol % or less, preferably 1.5 mol % or more and 4.8 mol % or less In contrast, the green body preferably does not include at least one of erbia ($Er_2O_3$), ceria ($CeO_2$), or a precursor thereof. The contents thereof are preferably at or below the detection limit (0 mol %) and are each, for example, less than 1 mol % in view of, for example, measurement errors.

The green body may be obtained by any method, and is preferably a green body obtained, for example, by mixing starting compounds and forming the mixture.

The mixing can be performed by any mixing method as long as the starting compounds are homogenized. A preferred mixing method is, for example, wet mixing of powders of the starting compounds. Specific examples of wet mixing include mixing using at least one selected from the group consisting of ball mills, bead mills, and agitation mills. Mixing using at least one of ball mills and bead mills is preferred, and mixing using a ball mill with zirconia balls having a diameter of 1.0 mm or more and 10.0 mm or less, the zirconia balls serving as grind media, is more preferred. In this embodiment, it is preferable to perform grinding during the wet mixing of powders of the starting compounds.

The forming can be performed by any forming method as long as a green body having a desired shape is obtained. The forming method is, for example, at least one selected from the group consisting of uniaxial pressing, cold isostatic pressing, slip casting and injection molding. A preferred forming method is, for example, at least one of uniaxial pressing or cold isostatic pressing, and a forming method involving uniaxial pressing followed by cold isostatic pressing is more preferred. A condition of uniaxial pressing is, for example, 20 MPa or more and 70 MPa or less, and a condition of cold isostatic pressing is, for example, 150 MPa or more and 250 MPa or less.

The shape of the green body may be any shape suitable for the intended use, and is, for example, at least one selected from the group consisting of disk-like, columnar, cubic, rectangular parallelepipedal, polyhedral, substantially polyhedral, plate-like, spherical and substantially spherical shapes.

In the sintering step, the green body is sintered in a reducing atmosphere to obtain a sintered body. As a result of this, a sintered body comprising a solid solution of cobalt and iron is obtained.

In the sintering step, the green body is sintered in a reducing atmosphere. By performing the sintering in a reducing atmosphere, both solid solution formation and precipitation of cobalt and iron proceed. Sintering in an oxidizing atmosphere alone provides a sintered body having, for example, a different color tone or an uneven color tone and cannot stably provide the sintered body according to this embodiment.

The reducing atmosphere in this embodiment is, for example, an atmosphere in which at least one of a reducing gas or a reducing heating material is used. The reducing gas is, for example, a gas containing at least one of hydrogen or carbon monoxide. The reducing heating material is, for example, a heating material made of carbon.

A preferred reducing atmosphere in this embodiment is, for example, an atmosphere of an inert gas in which a reducing heating material is used, or an atmosphere of argon or nitrogen in which a heating material made of carbon is used.

In the sintering step, any sintering method can be used. Atmospheric sintering or pressure sintering is preferred, and pressure sintering is more preferred. Heat sintering is preferably a hot pressing process or a hot isostatic pressing (hereinafter also referred to as "HIP") process, more preferably a HIP process. In this embodiment, atmospheric sintering is a method in which sintering is performed just by heating without applying any external force to the green body during the sintering, and pressure sintering is a method in which sintering is performed by heating with an external force applied to the green body during the sintering.

The sintering temperature in the sintering step is, for example, 1300° C. or higher and 1700° C. or lower, preferably 1300° C. or higher and 1675° C. or lower, and more preferably 1450° C. or higher and 1675° C. or lower.

Preferred sintering conditions are, for example, the following conditions.

Sintering Method: HIP Process

Sintering atmosphere: at least one of argon or nitrogen, preferably argon

Sintering temperature: 1300° C. or higher and 1675° C. or lower, preferably 1450° C. or higher and 1675° C. or lower Sintering time: 0.5 hours or more and 5 hours or less Sintering pressure: 50 MPa or more and 200 MPa or less, preferably 100 MPa or more and 175 MPa or less Heating material: carbon heater The production method according to this embodiment may comprise, before the sintering step, a presintering step of sintering the green body in a non-reducing atmosphere to obtain a presintered body.

The sintering atmosphere in the presintering step may be any non-reducing atmosphere, and is preferably an oxidizing atmosphere or an inert atmosphere, more preferably an oxidizing atmosphere, and still more preferably an air atmosphere.

Any presintering method can be used as long as sintering proceeds, and a sintering method in the presintering is preferably atmospheric sintering, and more preferably atmospheric sintering in an air atmosphere.

Presintering conditions are, for example, the following conditions.

Presintering method: atmospheric sintering
Presintering atmosphere: air atmosphere
Presintering temperature: 1300° C. or higher and 1500° C. or lower,
preferably 1300° C. or higher and 1450° C. or lower,
more preferably 1300° C. or higher and 1400° C. or lower
Presintering time: 30 minutes or more and 5 hours or less When the production method according to this embodiment comprises the presintering step, the presintered body, instead of the green body, is subjected to the sintering step.

The production method according to this embodiment may comprise a heat treatment step of heat treating the sintered body in an oxidizing atmosphere at 650° C. or higher and 1100° C. or lower.

Any heat treatment method can be used as long as it is a heat treatment in an oxidizing atmosphere. For reasons of convenience, the heat treatment is preferably performed just by heating without applying any external force to the sintered body during the heat treatment (hereinafter also referred to as "pressureless firing"), and more preferably performed by pressureless firing in an air atmosphere.

The heat treatment temperature is preferably 650° C. or higher and 1100° C. or lower, and more preferably 700° C. or higher and 950° C. or lower. When the zirconia includes two or more solute components, and particularly when the zirconia contains yttria and titania, the heat treatment temperature is preferably 700° C. or higher and 950° C. or lower.

The heat treatment time may be any time from 1 hour to 48 hours at the above heat treatment temperature.

A particularly preferred heat treatment step is performed, for example, under the following conditions.

Heat treatment method: pressureless firing
Heat treatment atmosphere: air atmosphere
Heat treatment temperature: 700° C. or higher and 1050° C. or lower,
preferably 800° C. or higher and 950° C. or lower
Heat treatment time: 1 hour or more and 10 hours or less

EXAMPLES

Hereinafter, the present invention will be specifically described with reference to examples. However, the present invention is not limited to these examples.

Methods of measuring the properties of the sintered body and powder according to this embodiment will be described below.

(Actual Density)

The actual density of a sintered body sample was measured by the Archimedes method. As a pretreatment, the sintered body sample was boiled to remove residual air bubbles on the surface of the sintered body sample.

(Crystal Phase and Monoclinic Fraction)

Using a powder X-ray analyzer (apparatus name: RINT Ultima III, manufactured by Rigaku Corporation), an XRD pattern on a surface of a sintered body sample was measured. The measurement conditions are as follows.

Radiation source: CuKα radiation ($\lambda=1.5405$ Å)

Measurement mode: continuous scanning
Step width: 0.02°
Scanning speed: 5°/min
Measurement range: 2θ=20° to 80°

A crystal phase was determined from the XRD pattern obtained, and a monoclinic fraction of zirconia was calculated by the following formula.

Monoclinic fraction (%)=$[I_m(111)+I_m(11\text{-}1)]\times 100/[I_m(111)+I_m(11\text{-}1)+I_t(111)+I_c(111)]$ In the above formula, $I_m(111)$ is an integrated intensity of the (111) plane of monoclinic zirconia, $I_m(11\text{-}1)$ is an integrated intensity of the (11-1) plane of monoclinic zirconia, $I_t(111)$ is an integrated intensity of the (111) plane of tetragonal zirconia, and, $I_c(111)$ is an integrated intensity of the (111) plane of cubic zirconia.

(Color Tone and Reflectance)

The color tone of a sintered body sample was determined by a method in accordance with JIS Z 8722. For the measurement, a commonly used color difference meter (apparatus name: Spectrophotometer SD3000, manufactured by Nippon Denshoku Industries Co., Ltd.) was used. The measurement conditions were as follows, and the color tone and the reflectance were determined by the SCE method, which excludes specular reflected light and measures diffuse reflected light.

Light source: D65 light source
Viewing angle: 10°

As the sintered body sample, a disk-like sintered body having a surface roughness Ra of 0.02 μm or less, a thickness of 1 mm and a diameter of 16 mm was used.

(Biaxial Bending Strength)

Using a method in accordance with ISO/DIS 6872, the biaxial bending strength of a sintered body sample was measured. For the measurement, a disk-like sintered body sample having a diameter of 16 mm and a thickness of 1 mm was used. The measurement was performed three times using sintered body samples prepared under the same conditions, and its average was calculated to determine the biaxial bending strength.

(Average Crystal Particle Size)

The average crystal particle size of zirconia crystal particles of a sintered body sample was measured by the intercept method.

As a pretreatment, the sintered body sample was mirror polished so as to have a surface roughness Ra of 0.02 μm or less and then subjected to thermal etching. Using an SEM, a surface of the resulting sintered body sample was observed at a magnification of 15,000 times to obtain an SEM observation image. From the SEM observation image obtained, 200 or more (250±50) zirconia crystal particles were randomly selected, and their crystal particle size was measured by the intercept method (k=1.78). Its average was calculated to determine the average crystal particle size of the zirconia crystal particles.

(EPMA Measurement and Measurement of Co Distribution and the Like)

Using an EPMA apparatus (apparatus name: EPMA 1610, manufactured by Shimadzu Corporation), a backscattered electron image was observed and an elemental map was determined under the following conditions.

Measurement mode: wavelength-dispersive mode
Acceleration voltage: 15 kV
Irradiation current: 300 nA
Analysis area: 51.2 μm×51.2 μm
Number of fields of view: three fields of view Using analysis software (product name: EPMA system Ver.2.14, manufactured by Shimadzu Corporation) included with EPMA 1610, the elemental map obtained was binarized, and the number of regions where the characteristic X-ray intensity of cobalt or iron in the background is 1.5 times or more was counted. Here, for cobalt, areas where no particles were observed when the intensity of the mapping results was set to 120 counts were regarded as backgrounds, and binarization was performed using a value 1.5 times the average background intensity as a threshold; and for iron, areas where no particles were observed when the intensity of the mapping results was set to 110 counts were regarded as backgrounds, and binarization was performed using a value 1.5 times the average background intensity as a threshold. Using the proportion of the number of target regions relative to the number of regions measured, a Co distribution, an Fe distribution, a most frequent Co distribution or a most frequent Fe distribution was determined.

As a sintered body sample, a disk-like sintered body having a surface roughness Ra of 0.02 μm or less, a thickness of 1 mm and a diameter of 16 mm was used.

Example 1

Iron oxide powder, cobalt oxide powder, 3 mol % yttria-containing zirconia powder and ethanol were wet mixed in a ball mill with zirconia balls to obtain a mixed powder including 0.04 wt % of iron oxide and 0.16 wt % of cobalt oxide, with the balance being 3 mol % yttria-containing zirconia. The mixed powder was dried in air at 110° C. and then sifted to obtain an aggregate powder having an aggregate particle size of 500 μm or less.

The aggregate powder was uniaxially press-molded by mold pressing with a pressure of 50 MPa and then treated by cold isostatic pressing with a pressure of 200 MPa to obtain a disk-like green body having a diameter of 20 mm and a thickness of 3 mm. The green body was sintered in an air atmosphere at 1350° C. for 2 hours to obtain a primary sintered body. The density of the primary sintered body was 5.98 g/cm$^3$.

The primary sintered body was subjected to a HIP treatment in an argon atmosphere at 1500° C. and 150 MPa for 1 hour to obtain a sintered body. The sintered body was subjected to pressureless firing in an air atmosphere at 900° C. for 8 hours to prepare a sintered body of this Example.

The results of elemental mapping of the sintered body of this Example are shown in Table below.

TABLE 1

| | Co distribution | | | | Fe distribution | | | | |
|---|---|---|---|---|---|---|---|---|---|
| | (3.5) | (4.5) | (5.0) | (5.5) | (3.5) | (4.5) | (5.0) | (5.5) | (6.0) |
| Example 1 | 31.2% | 22.1% | 13.5% | 0% | 12.6% | 4.9% | 2.8% | 2.7% | 0.4% |

The sintered body of this Example exhibited a jet-black color and had a Co distribution (5.5) of 0%, and no coarse particles were observed in the elemental map of cobalt. It can also be seen that as compared to the Co distribution, the Fe distribution is a smaller distribution.

The most frequent Co region and the most frequent Fe region were 42.4% and 65.4%, respectively.

Example 2

A sintered body of this Example was obtained in the same manner as in Example 1 except that a mixed powder including 0.40 wt % of iron oxide and 0.10 wt % of cobalt oxide, with the balance being 3 mol % yttria-containing zirconia, was used. The density of a primary sintered body was 6.05 g/cm$^3$.

Example 3

A sintered body of this Example was obtained in the same manner as in Example 1 except that a mixed powder including 0.25 wt % of iron oxide and 0.25 wt % of cobalt oxide, with the balance being 3 mol % yttria-containing zirconia, was used. The density of a primary sintered body was 6.02 g/cm$^3$.

FIG. 1 shows a backscattered electron image (FIG. 1(a)), an elemental map of iron (FIG. 1(b)) and an elemental map of cobalt (FIG. 1(c)) of the sintered body of this Example. It can be observed from FIG. 1 that the sintered body of this Example includes a Co—Fe solid solution, and the Co—Fe solid solution is included in the form of particles of 0.1 to 3.5 μm in the sintered body.

Furthermore, elemental mapping of zirconia crystal particles (dashed circle in FIG. 1(a)) showed that the content of cobalt and iron in the zirconia crystal particles was at or below the measurement limit.

Example 4

A sintered body of this Example was obtained in the same manner as in Example 1 except that a mixed powder including 0.10 wt % of iron oxide and 0.40 wt % of cobalt oxide, with the balance being 3 mol % yttria-containing zirconia, was used. The density of a primary sintered body was 5.95 g/cm$^3$.

The results of elemental mapping of the sintered body of this Example are shown in Table below.

TABLE 2

| | Co distribution | | | | Fe distribution | | | | |
|---|---|---|---|---|---|---|---|---|---|
| | (3.5) | (4.5) | (5.0) | (5.5) | (3.5) | (4.5) | (5.0) | (5.5) | (6.0) |
| Example 4 | 35.8% | 26.1% | 23.3% | 18.6% | 19.1% | 12.8% | 11.5% | 7.5% | 5.1% |

The sintered body of this Example exhibited a jet-black color and had a Co distribution (5.5) of 18.6%, and no coarse particles were observed in the elemental map of cobalt. It can also be seen that as compared to the Co distribution, the Fe distribution is a smaller distribution.

The most frequent Co region and the most frequent Fe region were 38.4% and 59.9%, respectively.

Example 5

A sintered body of this Example was obtained in the same manner as in Example 1 except that a mixed powder including 0.65 wt % of iron oxide and 0.35 wt % of cobalt oxide, with the balance being 3 mol % yttria-containing zirconia, was used. The density of a primary sintered body was 5.96 g/cm³.

Comparative Example 1

A sintered body of this Comparative Example was obtained in the same manner as in Example 1 except that a mixed powder including 0.02 wt % of iron oxide and 0.08 wt % of cobalt oxide, with the balance being 3 mol % yttria-containing zirconia, was used. The density of a primary sintered body was 5.76 g/cm³.

The results of elemental mapping of the sintered body of this Comparative Example are shown in Table below.

TABLE 3

| | Co distribution | | | | Fe distribution | | | | |
|---|---|---|---|---|---|---|---|---|---|
| | (3.5) | (4.5) | (5.0) | (5.5) | (3.5) | (4.5) | (5.0) | (5.5) | (6.0) |
| Comparative Example 1 | 2.1% | 0.4% | 0.4% | 0% | 0% | 0% | 0% | 0% | 0% |

The sintered body of this Comparative Example was a sintered body having a Co distribution (5.5) of 0% but not containing iron, and no coarse particles were observed in the elemental map of cobalt. However, the sintered body exhibited a light gray color and not a jet-black color.

Comparative Example 2

A sintered body of this Comparative Example was obtained in the same manner as in Example 1 except that a mixed powder including 0.50 wt % of cobalt oxide, with the balance being 3 mol % yttria-containing zirconia, was used. The sintered body obtained had a crack.

Comparative Example 3

A sintered body of this Comparative Example was obtained in the same manner as in Example 1 except that a mixed powder including 0.50 wt % of iron oxide, with the balance being 3 mol % yttria-containing zirconia, was used. The density of a primary sintered body was 6.02 g/cm³.

Comparative Example 4

A sintered body of this Comparative Example was obtained in the same manner as in Example 1 except that a mixed powder including 1.95 wt % of iron oxide and 1.05 wt % of cobalt oxide, with the balance being 3 mol % yttria-containing zirconia, was used. The density of a primary sintered body was 5.95 g/cm³. The sintered body obtained had a crack.

Elemental mapping was performed on a surface of the sintered body of this Comparative Example that was free of defects such as cracks. The results are shown in Table below.

TABLE 4

|  | Co distribution | | | | Fe distribution | | | | |
| --- | --- | --- | --- | --- | --- | --- | --- | --- | --- |
|  | (3.5) | (4.5) | (5.0) | (5.5) | (3.5) | (4.5) | (5.0) | (5.5) | (6.0) |
| Comparative Example 4 | 46.2% | 40.0% | 38.6% | 35.3% | 42.6% | 41.8% | 40.2% | 38.5% | 36.6% |

The sintered body of this Comparative Example had a Co distribution (5.5) of 35.3% and a cobalt and iron content of 3.0 mass % or more, and coarse particles were observed in the elemental map of cobalt. The sintered body partially exhibited a dark gray color and a dark brown color and had an ununiform color tone.

Comparative Example 5

A sintered body of this Comparative Example was obtained in the same manner as in Example 1 except that a mixed powder including 0.25 wt % of iron oxide and 0.25 wt % of cobalt oxide, with the balance being 3 mol % yttria-containing zirconia, was used and that the HIP treatment and firing after the HIP treatment were not performed. The density of a primary sintered body was 6.02 g/cm$^3$.

The evaluation results of Examples 1 to 5 and Comparative Examples 1 to 5 are shown in Table below.

contrast, the sintered body having a coloring agent content of 0.1 wt % (Comparative Example 1) and the sintered body containing no cobalt (Comparative Example 3) each exhibited a dark gray color and a dark brown color and had a non-blackish color tone with a tint.

The sintered body not subjected to sintering in a reducing atmosphere (Comparative Example 5) exhibited a light gray color, and the sintered body was interspersed with dots and did not have a uniform color tone.

The sintered body containing no iron (Comparative Example 2) and the sintered body having a coloring agent content of 3.0 wt % (Comparative Example 4) each had a crack and failed to be obtained as a defect-free sintered body.

Example 6

A sintered body of this Example was obtained in the same manner as in Example 1 except that iron oxide powder,

TABLE 5

|  | Composition of sintered body | | | | Actual density (g/cm$^3$) | Monoclinic fraction (%) | Average crystal particle size (μm) |
| --- | --- | --- | --- | --- | --- | --- | --- |
|  | Y$_2$O$_3$ (mol %) | CoO (wt %) | Fe$_2$O$_3$ (wt %) | Cobalt content | | | |
| Example 1 | 3.0 | 0.16 | 0.04 | 0.80 | 6.09 | 0 | 0.57 |
| Example 2 | 3.0 | 0.10 | 0.40 | 0.20 | 6.09 | 0 | 0.69 |
| Example 3 | 3.0 | 0.25 | 0.25 | 0.50 | 6.08 | 1.4 | 0.68 |
| Example 4 | 3.0 | 0.40 | 0.10 | 0.80 | 6.05 | 6.0 | 0.63 |
| Example 5 | 3.0 | 0.35 | 0.65 | 0.35 | 6.05 | 5.6 | 0.72 |
| Comparative Example 1 | 3.0 | 0.08 | 0.02 | 0.80 | 6.08 | 0 | — |
| Comparative Example 2 | 3.0 | 0.50 | 0 | 1.00 | | crack occurred | |
| Comparative Example 3 | 3.0 | 0 | 0.50 | 0 | 6.09 | 0 | — |
| Comparative Example 4 | 3.0 | 1.05 | 1.95 | 0.35 | | crack occurred | |
| Comparative Example 5 | 3.0 | 0.25 | 0.25 | 0.50 | 6.03 | 7.9 | — |

* In Table, "—" denotes unmeasured

TABLE 6

|  | Biaxial bending strength | Color tone | | |
| --- | --- | --- | --- | --- |
|  | (MPa) | L* | a* | b* |
| Example 1 | 2620 | 2.8 | 0.25 | 0.56 |
| Example 2 | 1920 | 1.6 | 0.25 | −0.19 |
| Example 3 | 2190 | 0.9 | 0.20 | −0.36 |
| Example 4 | 2050 | 1.0 | −0.02 | −0.21 |
| Example 5 | 1990 | 1.4 | 0.26 | −0.44 |
| Comparative Example 1 | 1458 | 12.2 | 0.38 | 3.60 |
| Comparative Example 3 | 2040 | 8.8 | 19.40 | 11.60 |
| Comparative Example 5 | 700 | 22.8 | 4.00 | 12.80 |

The sintered bodies of Examples each exhibited a jet-black color, and their main phase was a tetragonal phase. In cobalt oxide powder, aluminum oxide (Al$_2$O$_3$) powder and 3 mol % yttria-containing zirconia powder were used and that a mixed powder including 0.10 wt % of iron oxide, 0.40 wt % of cobalt oxide and 0.25 wt % of alumina, with the balance being 3 mol % yttria-containing zirconia, was used. The density of a primary sintered body was 6.04 g/cm$^3$.

Example 7

A sintered body of this Example was obtained in the same manner as in Example 1 except that a mixed powder of iron oxide (Fe$_2$O$_3$) powder (purity: 99% or more), cobalt aluminate (CoAl$_2$O$_4$) powder (purity: 99% or more) and 3 mol % yttria-containing zirconia powder (purity: 99.8% or more) was used. The mixed powder was composed of 0.10 wt % of iron oxide and 0.25 wt % of cobalt aluminate (made up of 0.14 wt % of Al$_2$O$_3$ and 0.11 wt % of CoO), with the balance being 3 mol % yttria-containing zirconia. The density of a primary sintered body was 6.05 g/cm$^3$.

Example 8

A sintered body of this Example was obtained in the same manner as in Example 7 except that a mixed powder of 0.10 wt % of iron oxide and 0.50 wt % of cobalt aluminate (made up of 0.28 wt % of $Al_2O_3$ and 0.22 wt % of CoO), with the balance being 3 mol % yttria-containing zirconia, was used. The density of a primary sintered body was 6.05 $g/cm^3$.

Example 9

A sintered body of this Example was obtained in the same manner as in Example 7 except that a mixed powder of 0.10 wt % of iron oxide and 1.00 wt % of cobalt aluminate (made up of 0.56 wt % of $Al_2O_3$ and 0.44 wt % of CoO), with the balance being 3 mol % yttria-containing zirconia, was used. The density of a primary sintered body was 6.04 $g/cm^3$.

Example 10

A sintered body of this Example was obtained in the same manner as in Example 7 except that a mixed powder of 0.10 wt % of iron oxide and 2.00 wt % of cobalt aluminate (made up of 1.12 wt % of $Al_2O_3$ and 0.88 wt % of CoO), with the balance being 3 mol % yttria-containing zirconia, was used. The density of a primary sintered body was 6.01 $g/cm^3$.

Example 11

A sintered body of this Example was obtained in the same manner as in Example 7 except that a mixed powder of 0.10 wt % of iron oxide and 3.00 wt % of cobalt aluminate (made up of 1.68 wt % of $Al_2O_3$ and 1.32 wt % of CoO), with the balance being 3 mol % yttria-containing zirconia, was used. The density of a primary sintered body was 5.99 $g/cm^3$.

The results of elemental mapping of the sintered body of this Example are shown in Table below.

TABLE 7

| | Co distribution | | | | Fe distribution | | | |
|---|---|---|---|---|---|---|---|---|
| | (3.5) | (4.5) | (5.0) | (5.5) | (3.5) | (4.5) | (5.5) | (6.0) |
| Example 11 | 40.3% | 30.1% | 26.9% | 23.7% | 15.7% | 7.3% | 3.0% | 2.1% |

The sintered body of this Example exhibited a jet-black color and had a Co distribution (5.5) of 23.7%, and no coarse particles were observed in the elemental map of cobalt. It can also be seen that as compared to the Co distribution, the Fe distribution is a smaller distribution.

Example 12

A sintered body of this Example was obtained in the same manner as in Example 7 except that a mixed powder of 0.10 wt % of iron oxide and 5.00 wt % of cobalt aluminate (made up of 2.8 wt % of $Al_2O_3$ and 2.2 wt % of CoO), with the balance being 3 mol % yttria-containing zirconia, was used. The density of a primary sintered body was 5.86 $g/cm^3$.

Physical property values of Examples 6 to 12 are shown in Table below.

TABLE 8

| | Composition of sintered body | | | | | Actual density ($g/cm^3$) | Monoclinic fraction (%) | Average crystal particle size (μm) |
|---|---|---|---|---|---|---|---|---|
| | $Y_2O_3$ (mol %) | $Al_2O_3$ (wt %) | CoO (wt %) | $Fe_2O_3$ (wt %) | Cobalt content | | | |
| Example 6 | 3.0 | 0.25 | 0.10 | 0.40 | 0.20 | 6.09 | 0 | 0.57 |
| Example 7 | 3.0 | 0.14 | 0.11 | 0.10 | 0.51 | 6.07 | 0 | 0.61 |
| Example 8 | 3.0 | 0.29 | 0.21 | 0.10 | 0.68 | 6.08 | 0 | — |
| Example 9 | 3.0 | 0.58 | 0.42 | 0.10 | 0.81 | 6.07 | 0 | 0.77 |
| Example 10 | 3.0 | 1.15 | 0.85 | 0.10 | 0.89 | 6.05 | 0 | — |
| Example 11 | 3.0 | 1.73 | 1.27 | 0.10 | 0.93 | 6.03 | 0 | — |
| Example 12 | 3.0 | 2.88 | 2.12 | 0.10 | 0.96 | 6.01 | 0 | 0.74 |

* In Table, "—" denotes unmeasured

The biaxial bending strength and the color tone of Examples 6 to 12 are shown in Table below.

TABLE 9

| | Biaxial bending strength (MPa) | Color tone | | |
|---|---|---|---|---|
| | | L* | a* | b* |
| Example 6 | 1850 | 2.0 | 0.30 | 0.64 |
| Example 7 | 1740 | 3.6 | 0.28 | 0.30 |
| Example 8 | 1670 | 3.7 | 0.42 | 1.10 |
| Example 9 | 1800 | 6.2 | 0.18 | 1.90 |
| Example 10 | 1940 | 6.4 | 0.70 | 3.20 |
| Example 11 | 1730 | 7.5 | 1.30 | 3.70 |
| Example 12 | 1580 | 8.5 | 0.50 | 3.70 |

It can be seen that although the sintered body having a coloring agent content of 0.50 wt % and not including alumina (Example 3) has a monoclinic fraction of more than 1%, the sintered bodies containing alumina each have a monoclinic fraction of 0% while having a coloring agent content of 0.21 wt % or more and 2.22 wt % or less.

Furthermore, the fact that the sintered bodies of Examples each exhibited a jet-black color shows that an alumina content within such a range (e.g., 0.2 wt % or more and 2.5 wt % or less) suppresses the formation of zirconia monoclinic crystals without affecting the color tone of the sintered bodies.

Example 13

A sintered body of this Example was obtained in the same manner as in Example 7 except that a mixed powder of 0.10 wt % of iron oxide and 5.00 wt % of cobalt aluminate, with the balance being 3 mol % yttria-containing zirconia, was used and that the HIP treatment temperature was 1650° C. The density of a primary sintered body was 5.84 g/cm$^3$. The sintered body of this Example had a jet-black color tone. The results are shown in Table below.

TABLE 10

| | Actual density (g/cm$^3$) | Monoclinic fraction (%) | Average crystal particle size (μm) | Biaxial bending strength (MPa) | Color tone | | |
|---|---|---|---|---|---|---|---|
| | | | | | L* | a* | b* |
| Example 13 | 5.99 | 0 | 2.50 | 1480 | 6.7 | 0.46 | 1.20 |

Example 14

A sintered body of this Example was obtained in the same manner as in Example 7 except that a mixed powder of 0.10 wt % of iron oxide and 5.00 wt % of cobalt aluminate, with the balance being 3 mol % yttria-containing zirconia, was used and that the temperature of pressureless firing was 800° C.

The density of a primary sintered body was 5.84 g/cm$^3$. The sintered body of this Example had a high density, high bending strength and a jet-black color tone.

Example 15

A sintered body of this Example was obtained in the same manner as in Example 7 except that a mixed powder of 0.10 wt % of iron oxide and 5.00 wt % of cobalt aluminate, with the balance being 3 mol % yttria-containing zirconia, was used and that the temperature of pressureless firing was 1000° C.

The density of a primary sintered body was 5.84 g/cm$^3$. The sintered body of this Example had a high density, high bending strength and a jet-black color tone.

The results of Examples 14 and 15 are shown in Table below.

In either case where the temperature of pressureless firing was 800° C. or 1000° C., the resulting sintered body exhibited a jet-black color. It can be seen that in the case of pressureless firing at 800° C., the values of the color tone of the resulting sintered body are all higher than in the case of pressureless firing at 1000° C.

Example 16

A sintered body of this Example was obtained in the same manner as in Example 1 except that iron oxide powder, cobalt oxide powder, titanium oxide powder, alumina powder, 3 mol % yttria-containing zirconia powder and ethanol were wet mixed in a bead mill with zirconia beads and that a mixed powder of 0.16 wt % of iron oxide, 0.04 wt % of cobalt oxide, 3.0 wt % of titanium oxide (corresponding to 4.69 mol % in terms of titania content) and 0.25 wt % of aluminum oxide, with the balance being 3 mol % yttria-containing zirconia, was used. The density of a primary sintered body was 6.08 g/cm$^3$.

Example 17

A sintered body of this Example was obtained in the same manner as in Example 16 except that iron oxide powder, cobalt oxide powder, titanium oxide powder, alumina powder, 3 mol % yttria-containing zirconia powder and ethanol were wet mixed in a ball mill with zirconia balls. The density of a primary sintered body was 5.94 g/cm$^3$.

The results of elemental mapping of the sintered bodies of Examples 16 and 17 are shown in Table below.

TABLE 11

| | Temperature of pressureless firing (° C.) | Actual density (g/cm$^3$) | Monoclinic fraction (%) | Average crystal particle size (μm) | Biaxial bending strength (MPa) | Color tone | | |
|---|---|---|---|---|---|---|---|---|
| | | | | | | L* | a* | b* |
| Example 14 | 800 | 6.01 | 0 | 0.76 | — | 7.2 | 0.91 | 3.10 |
| Example 15 | 1000 | 6.01 | 0 | 0.81 | 1540 | 4.5 | −2.90 | −1.30 |

TABLE 12

|  | Co distribution | | | | Fe distribution | | | | |
| --- | --- | --- | --- | --- | --- | --- | --- | --- | --- |
|  | (3.5) | (4.5) | (5.0) | (5.5) | (3.5) | (4.5) | (5.0) | (5.5) | (6.0) |
| Example 16 | 0.5% | 0% | 0% | 0% | 5.3% | 2.2% | 1.8% | 1.5% | 0.3% |
| Example 17 | 0% | 0% | 0% | 0% | 8.9% | 4.5% | 3.2% | 1.7% | 0.4% |

In both Examples 16 and 17, the total content of iron and cobalt is 0.2 wt %. It can be seen that the values of the Co distribution and the Fe distribution of Examples 16 and 17 are smaller than those of Example 1 in which the total content of iron and cobalt is equal to that in Examples 16 and 17. In the sintered body of Example 16, the most frequent Co region and the most frequent Fe region are 87.0% and 74.4%, respectively, indicating that when zirconia contains yttria and titania, the Co—Fe solid solution observed by elemental mapping tends to be finer.

Example 18

A sintered body of this Example was obtained in the same manner as in Example 1 except that iron oxide powder, cobalt oxide powder, titanium oxide powder, alumina powder, 3 mol % yttria-containing zirconia powder and ethanol were wet mixed in a ball mill with zirconia balls and that a mixed powder of 0.4 wt % of iron oxide, 0.1 wt % of cobalt oxide, 1.0 wt % of titanium oxide (corresponding to 1.59 mol % in terms of titania content) and 0.25 wt % of aluminum oxide, with the balance being 3 mol % yttria-containing zirconia, was used. The density of a primary sintered body was 6.02 g/cm$^3$.

Example 19

A sintered body of this Example was obtained in the same manner as in Example 18 except that a mixed powder of 0.4 wt % of iron oxide, 0.1 wt % of cobalt oxide, 2.0 wt % of titanium oxide (corresponding to 3.15 mol % in terms of titania content) and 0.25 wt % of aluminum oxide, with the balance being 3 mol % yttria-containing zirconia, was used. The density of a primary sintered body was 6.00 g/cm$^3$.

Example 20

A sintered body of this Example was obtained in the same manner as in Example 18 except that a mixed powder of 0.4 wt % of iron oxide, 0.1 wt % of cobalt oxide, 3.0 wt % of titanium oxide (corresponding to 4.70 mol % in terms of titania content) and 0.25 wt % of aluminum oxide, with the balance being 3 mol % yttria-containing zirconia, was used. The density of a primary sintered body was 5.96 g/cm$^3$.

Example 21

A sintered body of this Example was obtained in the same manner as in Example 18 except that a mixed powder of 0.24 wt % of iron oxide, 0.06 wt % of cobalt oxide, 3.0 wt % of titanium oxide (corresponding to 4.69 mol % in terms of titania content) and 0.25 wt % of aluminum oxide, with the balance being 3 mol % yttria-containing zirconia, was used. The density of a primary sintered body was 6.00 g/cm$^3$.

Example 22

A sintered body of this Example was obtained in the same manner as in Example 18 except that a mixed powder of 0.4 wt % of iron oxide, 0.1 wt % of cobalt oxide and 1.0 wt % of titanium oxide (corresponding to 1.58 mol % in terms of titania content), with the balance being 3 mol % yttria-containing zirconia, was used. The density of a primary sintered body was 6.06 g/cm$^3$.

Example 23

A sintered body of this Example was obtained in the same manner as in Example 18 except that a mixed powder of 0.4 wt % of iron oxide, 0.1 wt % of cobalt oxide and 2.0 wt % of titanium oxide (corresponding to 3.14 mol % in terms of titania content), with the balance being 3 mol % yttria-containing zirconia, was used. The density of a primary sintered body was 6.02 g/cm$^3$.

Example 24

A sintered body of this Example was obtained in the same manner as in Example 18 except that a mixed powder of 0.4 wt % of iron oxide, 0.1 wt % of cobalt oxide and 3.0 wt % of titanium oxide (corresponding to 4.69 mol % in terms of titania content), with the balance being 3 mol % yttria-containing zirconia, was used. The density of a primary sintered body was 5.99 g/cm$^3$.

The results of elemental mapping of the sintered bodies of Examples 18 to 24 are shown in Table below.

TABLE 13

|  | Co distribution | | | | Fe distribution | | | | |
| --- | --- | --- | --- | --- | --- | --- | --- | --- | --- |
|  | (3.5) | (4.5) | (5.0) | (5.5) | (3.5) | (4.5) | (5.0) | (5.5) | (6.0) |
| Example 18 | 44.9% | 16.3% | 4.9% | 3.2% | 65.5% | 49.1% | 44.3% | 33.5% | 18.8% |
| Example 19 | 46.2% | 21.2% | 9.6% | 8.8% | 6.39% | 58.8% | 46.7% | 40.6% | 22.2% |
| Example 20 | 50.9% | 15.7% | 7.1% | 5.0% | 63.1% | 56.0% | 49.0% | 39.7% | 18.2% |
| Example 21 | 0% | 0% | 0% | 0% | 7.4% | 3.0% | 1.7% | 1.5% | 0.5% |
| Example 22 | 48.7% | 22.7% | 12.1% | 6.9% | 59.7% | 44.0% | 31.8% | 24.7% | 8.1% |
| Example 23 | 52.3% | 22.5% | 6.3% | 4.3% | 67.5% | 56.2% | 49.4% | 44.5% | 22.5% |
| Example 24 | 32.4% | 7.5% | 6.3% | 6.3% | 58.8% | 46.8% | 36.5% | 27.7% | 14.9% |

Comparative Example 6

A sintered body of this Comparative Example was obtained in the same manner as in Example 18 except that a mixed powder of 0.08 wt % of iron oxide, 0.02 wt % of cobalt oxide, 3.0 wt % of titanium oxide (corresponding to 4.68 mol % in terms of titania content) and 0.25 wt % of aluminum oxide, with the balance being 3 mol % yttria-containing zirconia, was used. The density of a primary sintered body was 6.01 g/cm$^3$.

The results of elemental mapping of the sintered body of this Comparative Example are shown in Table below.

TABLE 14

|  | Co distribution | | | | Fe distribution | | | | |
| --- | --- | --- | --- | --- | --- | --- | --- | --- | --- |
|  | (3.5) | (4.5) | (5.0) | (5.5) | (3.5) | (4.5) | (5.0) | (5.5) | (6.0) |
| Comparative Example 6 | 0% | 0% | 0% | 0% | 0.4% | 0% | 0% | 0% | 0% |

Although the sintered body of this Comparative Example had a Co distribution (5.5) of 0%, the total content of cobalt and iron was 0.1 wt % or less, and no coarse particles were observed in the elemental map of cobalt. However, the sintered body exhibited a light gray color and not a jet-black color.

Physical property values of Examples 16 to 24 and Comparative Example 6 are shown in Table below.

TABLE 15

|  | Composition of sintered body | | | | | Actual density (g/cm$^3$) | Monoclinic fraction (%) | Average crystal particle size (μm) |
| --- | --- | --- | --- | --- | --- | --- | --- | --- |
|  | Y$_2$O$_3$ (mol %) | TiO$_2$ (mol %) | CoO (wt %) | Fe$_2$O$_3$ (wt %) | Al$_2$O$_3$ (wt %) | | | |
| Example 16 | 3.00 | 4.69 | 0.04 | 0.16 | 0.25 | 5.90 | 0 | |
| Example 17 | 3.00 | 4.69 | 0.04 | 0.16 | 0.25 | 5.92 | 0 | 1.09 |
| Example 18 | 3.00 | 1.59 | 0.10 | 0.40 | 0.25 | 6.02 | 0 | 0.90 |
| Example 19 | 3.00 | 3.15 | 0.10 | 0.40 | 0.25 | 6.00 | 0 | 1.10 |
| Example 20 | 3.00 | 4.70 | 0.10 | 0.40 | 0.25 | 5.96 | 0 | 1.10 |
| Example 21 | 3.00 | 4.69 | 0.06 | 0.24 | 0.25 | 5.94 | 0 | 1.11 |
| Example 22 | 3.00 | 1.58 | 0.1 | 0.40 | 0 | 5.97 | 0 | 0.90 |
| Example 23 | 3.00 | 3.14 | 0.1 | 0.40 | 0 | 5.96 | 0 | 0.90 |
| Example 24 | 3.00 | 4.69 | 0.1 | 0.40 | 0 | 5.96 | 0 | 1.10 |
| Comparative Example 6 | 3.00 | 4.68 | 0.02 | 0.08 | 0.25 | 5.89 | 0 | 1.22 |

The biaxial bending strength and the color tone of Examples 16 to 24 and Comparative Example 6 are shown in Table below.

TABLE 16

|  | Color tone | | |
| --- | --- | --- | --- |
|  | L* | a* | b* |
| Example 16 | 4.08 | 1.76 | 2.66 |
| Example 17 | 2.64 | 1.41 | 2.02 |
| Example 18 | 1.50 | 0.04 | −0.27 |
| Example 19 | 1.31 | 0.22 | −0.32 |
| Example 20 | 1.04 | 0.27 | −0.47 |
| Example 21 | 1.24 | 0.85 | 0.58 |
| Example 22 | 1.51 | −0.14 | −0.13 |
| Example 23 | 1.88 | 0.15 | 0.557 |
| Example 24 | 1.80 | 0.22 | 0.22 |
| Comparative Example 6 | 9.85 | 1.09 | 5.10 |

The sintered bodies of Examples each exhibited a jet-black color, whereas the sintered body of Comparative Example 6 having a coloring agent content of 0.10 wt % exhibited a gray color and, in particular, had a lightness L* of more than 9 and a hue b* of more than 5.

Figure 3:
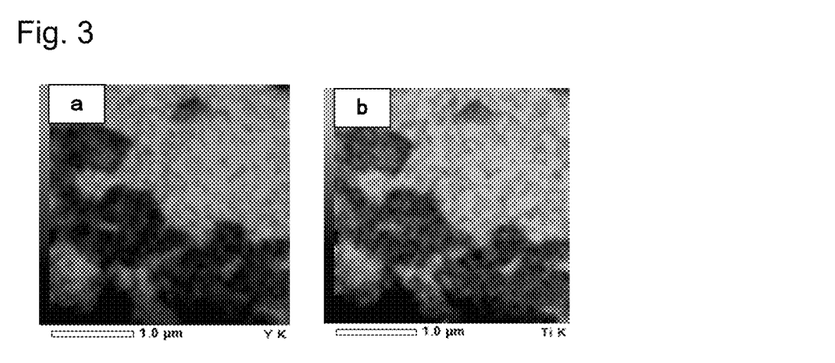

FIG. 3 shows elemental maps of titanium and yttrium of the sintered body of Example 17.

FIG. 3 shows that titanium and yttrium are similarly distributed and detected from the same particles. This shows that titania and yttria are dissolved in zirconia and the zirconia contains titania and yttria.

Comparative Example 7

A sintered body of this Comparative Example was obtained in the same manner as in Example 18 except that a mixed powder of 1.2 wt % of iron oxide, 0.3 wt % of cobalt oxide, 3.0 wt % of titanium oxide (corresponding to 4.68 mol % in terms of titania content) and 0.25 wt % of aluminum oxide, with the balance being 3 mol % yttria-containing zirconia, was used. The density of a primary sintered body was 5.97 g/cm$^3$. The sintered body obtained had a crack.

The results of elemental mapping of the sintered body of this Comparative Example are shown in Table below.

TABLE 17

|  | Co distribution | | | | Fe distribution | | | | |
| --- | --- | --- | --- | --- | --- | --- | --- | --- | --- |
|  | (3.5) | (4.5) | (5.0) | (5.5) | (3.5) | (4.5) | (5.0) | (5.5) | (6.0) |
| Comparative Example 7 | 35.9% | 32.3% | 30.4% | 29.0% | 43.6% | 40.5% | 40.5% | 37.4% | 31.0% |

In the sintered body of this Comparative Example, the content of cobalt and iron was less than 3.0 wt %, but the Co distribution (5.5) was 29.0%, and coarse particles were observed in the elemental map of cobalt. The sintered body partially exhibited a dark gray color and a dark brown color and had an ununiform color tone.

While the present invention has been described in detail with reference to a specific embodiment, it will be apparent to those skilled in the art that various alterations and modifications can be made without departing from the spirit and scope of the present invention.

The entire contents of the specification, claims, drawings and abstract of Japanese Patent Application No. 2018-145694 filed on Aug. 2, 2018 are cited herein and incorporated as a disclosure of the specification of the present invention.

The invention claimed is:

1. A sintered body comprising a solid solution containing cobalt and iron, with the balance being zirconia, wherein a total content of cobalt in terms of CoO and iron in terms of $Fe_2O_3$ is more than 0.1 wt % and less than 3.0 wt %, the content of chromium in terms of $Cr_2O_3$ is less than 0.1 wt %, and a proportion of cobalt regions larger than 5.5 um$^2$ in an elemental map obtained using an electron probe microanalyzer is 25% or less.

2. The sintered body according to claim 1, wherein a proportion of iron regions larger than 6.5 um$^2$ in the elemental map obtained using an electron probe microanalyzer is 30% or less.

3. The sintered body according to claim 1, wherein a proportion of iron regions larger than 5.0 um$^2$ in the elemental map obtained using an electron probe microanalyzer is 50% or less.

4. The sintered body according to claim 1, comprising aluminum oxide.

5. The sintered body according to claim 1, wherein the zirconia contains at least one selected from the group consisting of yttria, calcia, magnesia, vanadia and titania.

6. The sintered body according to claim 1, wherein the zirconia contains titania and yttria.

7. The sintered body according to claim 1, wherein the zirconia contains titania in an amount of 1.0 mol % or more and 6.0 mol % or less and yttria in an amount of 2.0 mol % or more and 4.0 mol % or less.

8. The sintered body according to claim 1, wherein the zirconia has a monoclinic fraction of 10% or less.

9. The sintered body according to claim 1, wherein crystal particles of the zirconia have an average size of 3.0 μm or less.

10. A method for producing the sintered body according to claim 1, comprising sintering, in a reducing atmosphere, a green body including a cobalt compound and an iron compound, with the balance being zirconia, wherein a total content of cobalt in terms of CoO and iron in terms of $Fe_2O_3$ is more than 0.1 wt % and less than 3.0 wt %.

11. The production method according to claim 10, wherein the reducing atmosphere is an atmosphere in which at least one of a reducing gas or a reducing heating material is used.

12. The production method according to claim 10, wherein the sintering is pressure sintering.

13. The production method according to claim 10, further comprising presintering the green body in a non-reducing atmosphere to obtain a presintered body.

14. The production method according to claim 10, further comprising heat treating the sintered body in an oxidizing atmosphere at 650° C. or higher and 1100° C. or lower.

* * * * *